Figure 1:
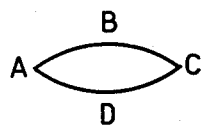

Dec. 18, 1934. J. B. FOURNIER 1,984,734
GAUGE TUBE
Filed Sept. 22, 1930

Inventor
J. B. Fournier
By E. F. Wenderoth
Atty

Patented Dec. 18, 1934

1,984,734

UNITED STATES PATENT OFFICE 1,984,734

GAUGE TUBE

Joseph Barbe Fournier, St.-Mande, France

Application September 22, 1930, Serial No. 483,697
In France October 4, 1929

2 Claims. (Cl. 73—109)

This invention relates to the manufacture of gauge tubes used for the measurement of pressure, or for instruments such as long-distance gauges or thermometers. Tubes of this character are usually elliptical and in the finished product they are usually torus-shaped.

In practice they are generally subjected to considerable pressure and the effect of this pressure reacts chiefly upon the plugs which close the ends of the torus and on the generatrices determined by the two extremities of the small axis of the elliptical cylinder formed by the tube before it is curved into torus shape. These plugs which of course are shaped in accordance with the exterior or the interior of the tube are welded to the extremities with a compound, generally tin, which will melt at relatively low temperatures.

The construction outlined is obviously unreliable for not only is the hardening of the metal altered by over heating, but the tin offers far less resistance to the pressure inside the tube than metals which melt at a much higher temperature, such as silver or copper. However, these latter metals are unsuitable for the purpose in question as the temperature to which the two ends of the gauge tube would have to be subjected would have a considerable effect on the pliability of the tube and consequently the gauge tube would not register correctly since its needle is controlled by the tube. For this reason tin continues to be used, and although grooves are constructed where the plugs come into direct contact, nevertheless leaks always originate because of the partial or total loosening of the plugs under the pressure inside the torus.

Various attempts have been made to eliminate such leaks while at the same time securing the proper pliability of the tube. Among other attempts it may be mentioned that the tube has been made with cylindrical extremities threaded upon either the inside or the outside, thereby allowing the tube to be closed or connected in any suitable manner with a smaller tube which communicates in turn with the area having the pressure to be measured. Nevertheless, the above mentioned defects have not as yet been satisfactorily remedied.

It is an object of the present invention to completely remove these defects by a construction whereby the ends of the tubes can either be closed or connected by means of autogenous welding, silver, or tin without affecting the pliability of the gauge tube in the slightest degree.

The gauge tube according to the present invention is made in one torus-shaped piece and extended into other tubes having a smaller diameter. These latter tubes have a length sufficient to permit the closing or the connecting welding of the tube sufficiently far from the gauge tube itself so that the heat required for the welding will have no effect upon the pliability of the tube. Accordingly, the tubes to be closed may have as small a diameter as desired and since the force which tends to dislodge the plugs is proportional to the area of the surface of the plugs upon which the pressure is exerted, all leaks from the plugs and all risks of leaks from the weldings connecting the tubes are avoided, especially in the case of long-distance measurements of pressures and temperature where the small tubes necessarily have a considerable length between the gauge itself and the area being measured.

Figure 2:
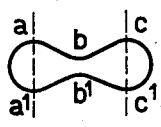
Figure 4:
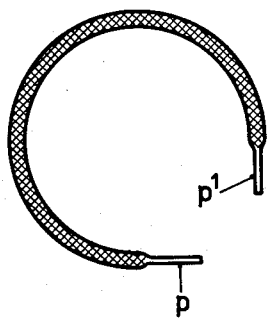
Figure 5:
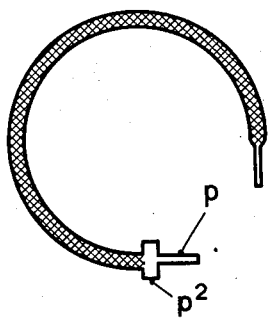
Figure 3:
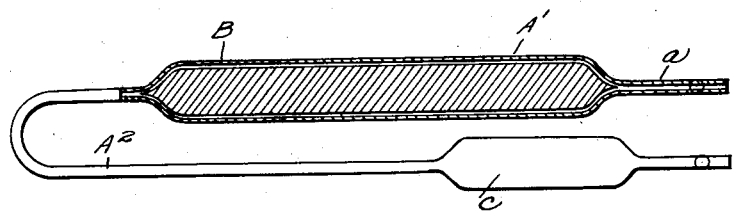
Figure 6:
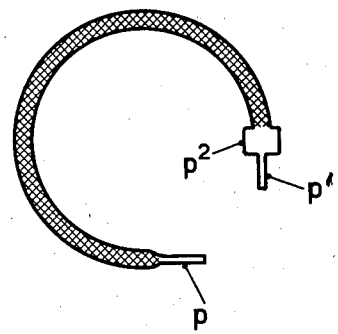
Figure 7:
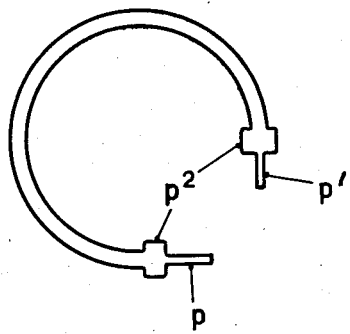

In the figures, wherein similar reference characters refer to like parts,

Figures 1 and 2 are diagrammatic representations of the cross sections of tubes, Figures 3, 4 and 5 illustrate different stages in the method of producing the tubes, and Figures 6 and 7 show tubes bent into the form of a torus.

The tubes described below are generally obtained from a metallic tube which is usually cylindrical. First this tube is drawn out at an end so as to have one portion of the original diameter lengthened by a flexible tube $a$ of small diameter. Inside the main portion of the tube an elongated body B is placed. This may be of any shape, but is preferably cylindrical and it is placed in such a way that one of its extremities touches the bottom of the tube where it joins the flexible tube $a$ of small diameter. This body B will be termed the "mandrel" and it may consist of a metal rod, a bunch of metal threads, etc. Upon the drawing the body of the solid mandrel B is represented by section lines, but the tube may have a liquid mandrel and be emptied of this liquid when it is the shape desired.

A tube is formed composed of three parts, the cylindrical part having the same diameter as the original tube, the cylindrical part $a$ of small diameter and the elliptical portion $A^1$ connecting the two preceding parts. Inside the latter is the body or mandrel B.

By drawing out the cylindrical part of the original diameter, a tube $A^2$ is obtained which can be of as small a diameter as desired.

In regard to the body or mandrel B introduced into the part $A^1$ of the tube, this cannot as a rule be withdrawn, but the presence of this body in the gauge tube is generally advantageous since the interior capacity of the tube is thereby lessened and the tube will curve better into the shape of a torus. Naturally the section of the body B is such that while facilitating the shaping of the tube, it does not block the tube completely and permits the gauge fluid to flow freely. If, however, the presence of the mandrel in the tube is undesirable, the metal mandrel can be replaced by a liquid body such as water or fine particles of solid matter such as sand. This may be done in the following manner.

The two extremities of the original cylindrical tube are lengthened into two narrow tubes. One of these tubes is hermetically sealed by a wire or small rod. At the other extremity a quantity of water is introduced into that portion of the tube which it is desired to lengthen. The tube is then closed. Several strokes are made with the die drawing the jaws nearer at every stroke until the cylindrical part has obtained the elliptical shape desired. A certain length of the small rod closing one of the extremities of the tube is then withdrawn so as to avoid the elliptical tube becoming mis-shaped since liquid cannot be compressed. The tube is then given a torus shape. Then the two small tubes are uncovered, allowing the water to flow away and the gauge tube is completed.

Sometimes the elliptical type of tube is unsuitable, particularly when very great pressures are to be measured which may bend the tube out of shape or even burst the same. The pressure at the inside of the tube acts upon the opposite concave surfaces A, B, C—A, D, C and tends to transform the tube into a tube having circular sections. In order to avoid these results a hyperbolic gauge tube may be obtained, in which case the two concave surfaces referred to above are replaced by two convex surfaces. The right section of such a tube is shaped like a hyperbole $a$, $b$, $c$—$a'$, $b'$, $c'$ (see Fig. 2), in which the two arcs are joined by two curves $a$, $a^1$—$c$, $c^1$. The two extremities of a tube thus obtained are prolonged in the manner as stated above with reference to the elliptical tubes, a hyperbolic gauge tube will be secured in one piece with its capillary prolongations at each extremity thereof.

Figure 3 illustrates a tube suitable for certain uses. A part of the cylindrical tube is prolonged into a flexible tube $A^2$ of the required length and terminates at its other extremity in a cylindrical tube C of a diameter equal to that of the original tube or different therefrom, if desired. The tube in Figure 3 shows a small diameter tube $a$ made from the elliptical part $A^1$ containing the mandrel B which will be the tube of the gauge instrument and the small tube $A^2$ will constitute the transmission tube, while the cylindrical part having the larger diameter C will be located in the position where measurements are to be taken. The connection of the elliptical tube $A^1$ by means of the small tube $A^2$ with the cylindrical reservoir C is suitable for the construction of long-distance thermometers of metal operating either by the expansion of mercury or by the tension of steam vapors. In such case the small diameter tube $A^2$ will be the transmission tube from the place at which the temperature is being measured to the place where the temperature is being noted.

Mercury attacks all ordinary metals except steel. The outside of the gauge or the thermometric envelope in which mercury is to be placed so as to act as a thermometric agent must therefore be entirely of steel without any soldering. The thermometric envelope in such an instrument is composed of the gauge tube, of a flexible tube of the desired length according to the size of the instrument and a small metal tube acting as a thermometric reservoir. Such a device as shown in Figure 3, can be used as a thermometric envelope whether the thermometric agent is mercury or any other fluid.

The gauge tubes obtained are rolled around suitable mandrels to be transformed into gauge tubes having the shape of a torus such as those shown in Figures 6 and 7. The small end tubes $p$ and $p^1$ can have upon the same gauge tube diameters and lengths which are unequal. They may also have the cylindrical parts $p^2$ if required so as to facilitate the setting up. The tubes may also be spirally rolled in one or several spirals and the spirals may be helicoidal or hyperbolic, etc.

In the tubes made according to the invention the plugs which are always liable to leak are eliminated since the operation of blocking is performed at a distance from the gauge tube by placing a very small quantity of soldering in one of the small tubes $p$ or $p^1$, thereby prolonging the gauge tube itself which acts as an actuator for the needle indicating the pressure. The force acting upon the point where the small tube is soldered which closes a $\frac{5}{10}$ mm. tube for example, and having therefore an area of $\frac{2}{10}$ sq. mm., is to the plugs of an elliptical tube having an area of 48 sq. mm., which is the usual dimension for gauge tubes, as 2 is to 488, which means that the force acting upon the soldering closing the gauge tube in accordance with the invention is 244 times less than that acting upon the plugs of gauge tubes used at the present time. In addition, the soldering in tubes made according to the present invention is located at a distance from the gauge tube itself, that is, from that part of the tube which is usually torus-shaped and used as the actuator for the needle. With such a construction the pliability of the tube cannot be altered or affected by the heat necessary for soldering. Water-tight conditions are therefore obtained which were impossible to obtain before, and the stability and functioning of the tubes as constructed according to the present invention are largely improved when compared with the usual gauge tubes. Furthermore, any overheating of the tube must be avoided when the tube is fixed to the box. Consequently no soldering should be used which is liable to overheat the tube when this operation is performed. The tube may be fixed in the box by using the bosses made in it at the time the tube is prolonged, and these bosses may be threaded or prismatic.

It is understood that the construction described above is merely a preferred form of the invention and is not to be interpreted in a limiting sense.

I claim:

1. Manometric tube in which the torus shaped body of the tube, serving to actuate a needle or indicator element, is continued at each end by extensions integral with said torus and consisting of tubes having a capillary bore, the length of which is such that the closure or junction seams are situated at a sufficient distance from the torus so that the heat produced by the welding, soldering or seaming cannot affect the elasticity of the active portion of the tube.

2. A one piece manometric assembly including a manometric tube having a torus shaped body serving to actuate an indicator element, said body being continuous at each end with integral extensions in the form of tubes having a capillary bore, and a hollow chamber integral and continuous with one of said tubes, said chamber having a larger section than the tube to which it is connected and being adapted to receive a fluid whose pressure is to be measured.

JOSEPH BARBE FOURNIER.